April 11, 1961  L. H. BARRON  2,978,846
DRILL AND COUNTERSINK TOOL
Filed Oct. 8, 1956

INVENTOR
LEE H. BARRON
BY
ATTORNEY

United States Patent Office 2,978,846
Patented Apr. 11, 1961

2,978,846
DRILL AND COUNTERSINK TOOL
Lee H. Barron, 612 W. Elk Ave., Glendale 4, Calif.
Filed Oct. 8, 1956, Ser. No. 614,698
4 Claims. (Cl. 51—206)

This invention relates to a diamond coated tool for making holes of varied diameters and depths in hard, brittle or tough material.

One object of the invention is to provide a tool for drilling and countersinking holes in difficultly drilled materials such as reinforced synthetic plastic, laminated plastic structures, and the like. Another object is to provide a tool for drilling, counterboring and countersinking holes in difficultly drilled material. A further object is to provide a diamond coated tool for making accurately sized holes of varied diameter and depths in hard, brittle or tough materials.

These and other objects are attained by my invention which will be understood from the following description, reference being made to the accompanying drawings in which.

Figure 2:
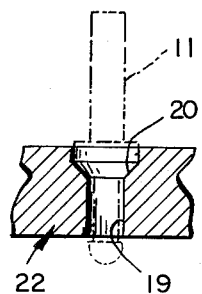
Fig. 2 is a sectional view showing the hole produced by the tool of Fig. 1.

In general, my tool consists of shank 11 adapted for chucking or other form of attachment to a rotary mechanism such as a drill press. Extending coaxially from the inner end of the shank 11, usually integral therewith, is a cylindrical guide rod 12 having a boring head 13 which is rounded on its end portion and coated with diamond grits 14 embedded in an electroplated nickel coating 15 which extends over the rounded end portion as well as on the contiguous cylindrical wall 16 of the boring head 13. Intermediate the guide rod 12 and the shank 11 there is provided a cylindrical enlargement 17 having a tapered connecting portion 18 whose conical surface is coated with diamond grits 14 set in an electroplated nickel coating 15. The hole 19 and the countersink 20 in the work piece 22 are shown in Fig. 2, with the position of the tool being indicated at the completion of the boring operation. The taper of the countersink 20 is carried below the top surface of the work piece.

Figure 1:
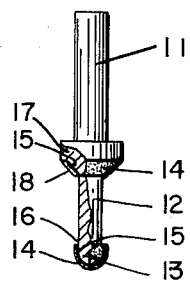
Fig. 1 is a side elevational view partly in section showing a simple form of my combined drill and countersink tool.
Figure 3:
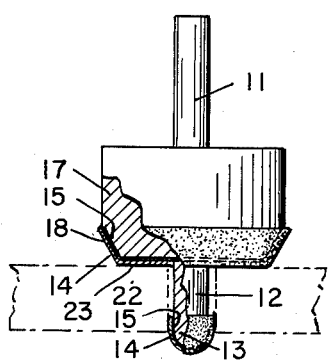
Fig. 3 is a side elevational view partly in section of another form of my combined drill and countersink tool, shown in relation to a work piece at the intermediate stage where the countersink portion of the tool is about to start cutting.
Figure 4:
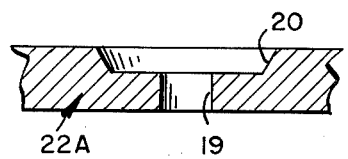
Fig. 4 is a cross-sectional representation of the work piece with the hole and countersink made by the tool shown in Fig. 3.

In the modification shown in Fig. 3, the shank 11 and guide rod 12 with the boring head 13 covered with diamond grits 14 embedded in the nickel coating 15 are disposed similarly to the form shown in Fig. 1. The cylindrical enlargement 17 is proportionally much larger, and the conical surface of the connector 18 ends at the countersink bottom surface 23. The conical connector 18 and the countersink bottom surface 23 are both coated with diamond grits 14 embedded in the nickel coating 15. The hole 19 and countersink 20 in the work piece 22A, as made by the tool of Fig. 3, are shown in Fig. 4. The taper of the countersink ends at the top surface of the work piece.

Figure 6:
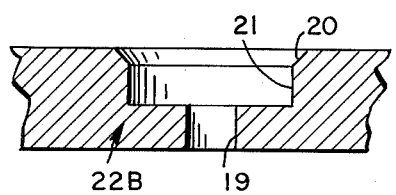
Fig. 6 is a cross-sectional representation of the work piece with the hole, counterbore and countersink made by the tool shown in Fig. 5.
Figure 5:
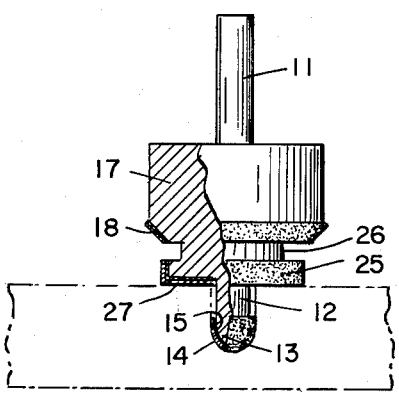
Fig. 5 is an elevational view partly in section showing a combined drill, counterbore and countersink tool, shown in relation to a work piece at the intermediary stage where the counterbore portion of the tool is about to start cutting.

In the modification shown in Fig. 5, the shank 11 and the guide rod 12 with the boring head 13 covered with diamond grits 14 embedded in the nickel coating 15 are disposed similarly to the form shown in Fig. 1. The cylindrical enlargement 17 terminates in a tapered connector 18 which adjoins another concentric smaller cylindrical counterbore member 25. The counterbore end surface 27 as well as the cylindrical surface of the member 25, and the tapered connector 18 are all covered with diamond grits 14 embedded in nickel coating 15. The hole 19, the countersink 20 and the counterbore 21 in the work piece 22B are shown in Fig. 6. The counterbore cylinder member 25 may be provided with a relief groove 26 as shown.

The surfaces covered with diamond grits embedded in a nickel coating are produced by an electroplating process. After the tool blank has been formed and finished, its surfaces are painted with a suitable masking lacquer in the zones which are not to be diamond coated. After electrochemically cleaning the surfaces of the tool which are exposed and on which diamond coating is desired, the tool is immersed in a plating liquid such as "Watts" solution (for example, consisting of 10 pounds of nickel sulfate, 1 pound 14½ ounces of nickel chloride, and 1 pound 4 ounces of boric acid dissolved in 5 gallons of distilled water). The exposed portions were first given an initial electroplate coating of about .002 inch of nickel. While still in the plating bath and without interrupting the current flow, selected and graded diamond grits were then piled on the exposed surfaces of the tool (using temporary shelf members encircling the parts where necessary to hold the diamond grits in place.) A coating of nickel was then electroplated on the exposed tool parts, embedding and more or less enveloping the diamond grits thereon, this covering including the diamond grits being .002 to .010 inch in thickness depending upon the grit sizes and other factors. The electroplating is usually continued for 8 to 10 hours at a low current density. At the end, the unattached diamond grits are removed, and after washing, the tool is ready for use.

The advantages of my tool will be apparent. The diamond coating permits the tool to cut accurate holes with countersinking, with or without counterboring, in a single pass through the work pieces. The diamond coated tool may be used dry, even in tough glass-reinforced plastic sheets, thus avoiding degrading of the dielectric properties which occurs when cooling liquids are used. The diamond coatings cut so easily and smoothly through all kinds of material that even in laminated materials having layers of different materials, the holes are accurate and the boring is fast and economical.

I claim:

1. A composite concentric hole cutting and boring tool comprising a metal shank adapted to be attached for rotation to a drill press or the like; a guide rod extending longitudinally from said shank and coaxial therewith said guide rod being cylindrical and smooth; a concentric boring head extending from the free end of said guide rod, said boring head being rounded on its end portion, and being provided with a cutting surface consisting of a compact aggregate of diamond grits of multiple particle thickness held together and to said round end surface by a bond of nickel; and a hole cutter comprising a concentric metal body disposed intermediate said shank and said guide rod, the surface of said concentric body being a cylindrical and smooth, tapered joining surface between said concentric body and said guide rod on the face contiguous to said rounded end of the boring head, said joining surface being provided with a coating consisting of a compact aggregate of diamond grits of multiple particle thickness held together and to said metal surface by a bond of electrodeposited nickel.

2. The composite concentric hole cutting and boring tool defined in claim 1 in which the joining surface between the concentric body and said guide rod comprises a truncated cone.

3. The composite concentric hole cutting and boring tool defined in claim 1 in which the joining surface between the concentric body and the guide rod comprises a truncated cone, a cylindrical surface of smaller diameter than said body, and the end surface of said smaller diameter cylinder.

4. The composite concentric hole cutting and boring tool defined in claim 1 in which the joining surface between the concentric body and the guide rod consists of a truncated cone, a cylindrical surface of smaller diameter than said body; and the end surface of said smaller diameter cylinder; said smaller diameter cylinder having a peripheral relief groove disposed adjacent the smaller base of said truncated cone.

References Cited in the file of this patent

UNITED STATES PATENTS

| | | |
|---|---|---|
| 152,442 | Walters et al. | June 23, 1874 |
| 2,020,117 | Johnston | Nov. 5, 1935 |
| 2,057,421 | Dickson | Oct. 13, 1936 |
| 2,359,920 | Keeleric | Oct. 10, 1944 |
| 2,360,798 | Seligman et al. | Oct. 17, 1944 |
| 2,362,260 | Foster | Nov. 7, 1944 |
| 2,370,970 | Keeleric | Mar. 6, 1945 |